(12) United States Patent
Tao

(10) Patent No.: US 8,682,924 B2
(45) Date of Patent: *Mar. 25, 2014

(54) HYBRID AND ITERATIVE KEYWORD AND CATEGORY SEARCH TECHNIQUE

(71) Applicant: International Business Machines Corporation, Armonk, NY (US)

(72) Inventor: Jim J. Tao, Sewickley, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/791,471

(22) Filed: Mar. 8, 2013

(65) Prior Publication Data

US 2013/0191400 A1 Jul. 25, 2013

Related U.S. Application Data

(63) Continuation of application No. 13/117,042, filed on May 26, 2011.

(51) Int. Cl.
*G06F 7/00* (2006.01)
*G06F 17/30* (2006.01)
*G06F 17/00* (2006.01)

(52) U.S. Cl.
USPC ............................ 707/769; 707/771; 707/778

(58) Field of Classification Search
USPC .......................................................... 707/769
See application file for complete search history.

(56) References Cited

U.S. PATENT DOCUMENTS

| | | | |
|---|---|---|---|
| 6,385,602 B1* | 5/2002 | Tso et al. | ............................... 1/1 |
| 6,571,239 B1 | 5/2003 | Cole et al. | |
| 7,428,582 B2 | 9/2008 | Bean et al. | |
| 7,620,627 B2 | 11/2009 | Cava | |
| 7,636,714 B1 | 12/2009 | Lamping et al. | |

(Continued)

FOREIGN PATENT DOCUMENTS

| | | |
|---|---|---|
| CN | 101931654 | 12/2010 |
| EP | 1681823 | 7/2006 |
| WO | 2010/033950 | 3/2010 |

OTHER PUBLICATIONS

Bellwood, T., L. Clement, D. Ehnebuske, A. Hately, M. Hondo, Y.L. Husband, K. Januszewski, S. Lee, B. McKee, J. Munter, and C. Von Riegen, "UDDI Version 3.0", UDDI Spec Technical Committee Specification, [online], Jul. 19, 2002, [retrieved on Jul. 19, 2002], retrieved from the Internet at <URL: http://www.uddi.org/pubs/uddi-v3.00-published-20020719.htm>, 380 pp.

(Continued)

*Primary Examiner* — Kannan Shanmugasundaram
(74) *Attorney, Agent, or Firm* — Janaki K. Davda; Konrad, Raynes, Davda & Victor LLP

(57) ABSTRACT

Provided are techniques for providing recommendations to improve a query. A query with query keywords and selected categories is received. In response to determining that the selected categories are ranked high with reference to query relevance indicator values for each of the selected categories, a query relevance indicator of the query is calculated with each subcategory using keyword relevance indicators, each subcategory is ranked based on the query relevance indicators, and the ranked subcategories are provided for use in selecting new categories to be submitted with the query.

8 Claims, 7 Drawing Sheets

(56) References Cited

U.S. PATENT DOCUMENTS

| | | | |
|---|---|---|---|
| 7,933,764 | B2 | 4/2011 | Kang et al. |
| 8,074,234 | B2 | 12/2011 | Tang et al. |
| 8,352,491 | B2 | 1/2013 | Roshen |
| 2003/0088553 | A1 | 5/2003 | Monteverde |
| 2003/0187841 | A1* | 10/2003 | Zhang et al. ............... 707/4 |
| 2004/0078216 | A1* | 4/2004 | Toto ............... 705/2 |
| 2006/0117002 | A1 | 6/2006 | Swen |
| 2007/0118509 | A1 | 5/2007 | Svendsen |
| 2007/0136236 | A1* | 6/2007 | Kussmaul et al. ............... 707/2 |
| 2007/0214154 | A1* | 9/2007 | Ducatel et al. ............... 707/100 |
| 2007/0288433 | A1* | 12/2007 | Gupta et al. ............... 707/3 |
| 2008/0104050 | A1 | 5/2008 | Kehl |
| 2009/0049040 | A1 | 2/2009 | Fay et al. |
| 2009/0222444 | A1 | 9/2009 | Chowdhury et al. |
| 2009/0313236 | A1 | 12/2009 | Hernacki et al. |
| 2010/0036822 | A1 | 2/2010 | Riley et al. |
| 2010/0131563 | A1 | 5/2010 | Yin |
| 2010/0174691 | A1 | 7/2010 | Caldwell et al. |
| 2010/0185619 | A1 | 7/2010 | Zhang et al. |
| 2010/0228742 | A1 | 9/2010 | Vandelle et al. |
| 2011/0119242 | A1 | 5/2011 | Chen et al. |
| 2011/0179007 | A1 | 7/2011 | Shi |
| 2012/0095980 | A1* | 4/2012 | Elyada ............... 707/706 |
| 2012/0303651 | A1 | 11/2012 | Tao |

OTHER PUBLICATIONS

Colgrave, J., "A New Approach to UDDI and WSDL, Part 2: Queries Supported by the New Oasis UDDI WSDL Technical Note", [online], Sep. 3, 2003, [retrieved on Febraury 14, 2011], retrieved from the Internet at <URL: http://www.ibm.com/developerworks/webservices/library/ws-udmod2.html>, 6 pp.

Deng, J., Q. Zheng, and H. Peng, "Topic Distillation and Clustering Algorithm", Proceedings of the Fifth International Conference on Machine Learning and Cybernetics, Aug. 2006, 6 pp.

Espinoza, M. and E. Mena, "Discovering Web Services Using Semantic Keywords", Proceedings of the 5th IEEE International Conference on Industrial Informatics, Jun. 2007, 6 pp.

Fung, B.C.M., K. Wang, and M. Ester, "Hierarchical Document Clustering Using Frequent Itemsets", Proceedings of the SIAM International Conference on Data Mining, 2003, 12 pp.

IBM Corp., "WebSphere Service Registry and Repository", White Paper, [online], [Retrieved on Apr. 25, 2011], retrieved from the Internet at <URL: http://www-01.ibm.com/software/integration/wsrr/>, 2 pp.

Kang, S., "Keyword-Based Document Clustering", Proceedings of the Sixth International Workshop on Information Retrieval with Asian Languages—vol. 11, 2003, 6 pp.

Salton, G., A. Wong, and C.S. Yang, "A Vector Space Model for Automatic Indexing", Communications of the ACM, vol. 18, No. 11, Nov. 1975, 8 pp.

Willett, P., "Recent Trends in Hierarchic Document Clustering: A Critical Review", Information Processing and Management, vol. 24, No. 5, 1988, 21 pp.

Zhang, L., H. Li, and H. Chang, "XML Based Advanced UDDI Search Mechanism for B2B Integration", Electronic Commerce Research, vol. 3, Issue 1-2, Jan.-Apr. 2003, 10 pp.

International Search Report & Written Opinion, Sep. 13, 2012, for Application No. PCT/IB2012/052068, Total 12 pp.

Preliminary Amendment, Mar. 8, 2013, for U.S. Appl. No. 13/117,042, filed May 26, 2011 by J.J. Tao, Total 7 pp. [54.55 (PrelimAmend)].

Aguliera, U. et al., "A Semantic Matching Algorithm for Discovery in UDDI", dated 2007, International Conference on Semantic Computing, IEEE Computer Society, 8pp.

Anyanwu, K. et al., "Effectively Interpreting Keyword Queries on RDF Databases With a Rear View", dated 2011, Semantic Computing Research Lab, Department of Computer Science, North Carolina State University, Raleigh NC,16 pp. (International Semantic Web Conference 2011, Bonn, Germany).

Blake, R. et al., "A Survey of Schema Matching Research", dated Sep. 1, 2007, College of Management Working Papers and Reports, Paper 3, University of Massachusetts Boston, 37 pp.

Dong, X. et al., "Similarity Search for Web Services", dated 2004, Proceedings of the 30th VLDB Conference, Toronto Canada, 12 pp.

Ferre, S. et al., "Semantic Search: Reconciling Expressive Querying and Exploratory Search", dated 2011, International Semantic Web Conference, Bonn Germany, 16 pp.

Kraus, N. et al., "Context-Sensitive Query Auto-Completion", dated Mar. 28-Apr. 1, 2011, Hyderabad India, 10 pp.

Theobald, M. et al., "TopX: Efficient and Versatile Top-k Query Processing for Semistructured Data", received Sep. 14, 2006, published Oct. 7, 2007, The VLDB Journal (2008), 35 pp.

Zenz, G. et al., "From Keywords to Semantic Queries—Incremental Query Construction on the Semantic Web", dated Jul. 18, 2009, L3S Research Center, Appelstr. 9a, Hannover Germany, 24 pp.

Office Action, dated Apr. 10, 2013, for U.S. Appl. No. 13/117,042, filed May 26, 2011, entitled "Hybrid and Iterative Keyword and Category Search Technique", invented by J.J Tao et al., pp. 1-34.

Response to Office Action, dated Jul. 10, 2013, for U.S. Appl. No. 13/117,042, filed May 26, 2011, entitled "Hybrid and Iterative Keyword and Category Search Technique", invented by J.J Tao et al., pp. 1-16.

Notice of Allowance, dated Oct. 16, 2013, for U.S. Appl. No. 13/117,042 (54.55), filed May 26, 2011, entitled, "Hybrid and Iterative Keyword and Category Search Technique", pp. 1-15.

* cited by examiner

HYBRID AND ITERATIVE KEYWORD AND CATEGORY SEARCH TECHNIQUE

CROSS-REFERENCE TO RELATED APPLICATION

This patent application is a continuation of U.S. patent application Ser. No. 13/117,042, filed May 26, 2011, which patent application is incorporated herein by reference in its entirety.

FIELD

Embodiments of the invention relate to a hybrid and iterative keyword and category search for distributed computing systems and network environments, and, more specifically, for any network-based services.

BACKGROUND

The Internet and the World Wide Web (WWW or Web) have revolutionized information technology in the past two decades. As a human-to-machine and client-server technology, the Web enables any person, with a computer connected to the Internet, to access any published information on the Internet from his or her fingertips.

Web pages are documents written in, for example, Hypertext Markup Language (HTML). Due to a vast amount of web content, most web users rely on web search engines to search for useful web pages through keyword search.

To facilitate the integration of computing systems and provide more interactive user experiences and rich content to users, new web technologies, many of them based on Extensible Markup Language (XML), have been introduced in recent years. Two of these technologies are Web Services and Asynchronous JAVASCRIPT and XML (AJAX). (JAVASCRIPT is a trademark or registered trademark of Oracle and/or its affiliates.) Web Services may be described as a machine-to-machine distributed computing technology that overcomes the difficulties of enabling computer programs to communicate with each other in a heterogeneous computing environment. These difficulties are introduced by the different computer platforms, incompatible communication protocols, and various computer languages used by computer programs. As a standard-based comprehensive solution to conquer these challenges, Web Services is widely supported by industries. Web Services is based on a series of standards, such as XML, Simple Object Access Protocol (SOAP), and Web Services Description Language (WSDL). These standards provide a common format, syntax, and protocols for applications running on computers and electronic devices to exchange information among them over networks. Unlike Web Services, AJAX does not define a set of standards. AJAX enables web applications to send data from client to server asynchronously. AJAX can be utilized to implement RESTful (Representational State Transfer) Web Services.

For instance, a company may create a marketplace web site for different vendors to sell their products. Examples of web services include the web site's flexible fulfillment web service and payments web service, which are utilized to integrate the marketplace web site with the information systems of those vendors.

To facilitate publishing and searching web services, a Universal Description, Discovery and Integration (UDDI) standard had been developed. The UDDI standard defines how to create a web service UDDI registry to enable web service providers to publish their web services and to enable web service consumers to search and use these published web services.

A non-UDDI web service registry may offer web service governance features and semantic web technologies. Such web service registries or repositories store additional web services related metadata to govern the life cycles of web services. Web Ontology Language (OWL) is an ontology-based markup language, which was originally developed in academic research to present data on the web in a machine-understandable form. OWL may be used to organize the web services related metadata in a web service registry.

In conventional systems, keyword search is used by a web service consumer to find proper web services in a web service registry. The keywords of a web service can be manually specified by a web service provider. An automatic keyword generation process may be used to generate keywords from web service metadata. The combination of the manual approach and the automatic approach, such as letting the provider verify or modify the generated keywords, may also be used.

UDDI and other registries provide query Application Programming Interfaces (APIs) and/or Graphical User Interfaces (GUIs) to enable web service consumers to search for the web services published in the web service registry. With these query APIs or GUIs, users provide keywords, strings or other data of specific web service metadata fields to conduct the search.

For example, a UDDI client may query a UDDI registry to find web services based on the name, the business entity to which they belong, and the category into which they fall. In this example, the user provides the partial or full name of the web service, the business entity and/or the category to construct such a search query.

The existing web service registry technologies allow the user to search web services with composite queries. The search result of such a query is the intersection or union of the collection of the search results of the simple queries of which the composite query is made.

There is a need in the art for an improved technique of discovering services, such as web services.

SUMMARY

Provided are a method, computer program product, and system for providing recommendations to improve a query. A query with query keywords and selected categories is received. In response to determining that the selected categories are ranked high with reference to query relevance indicator values for each of the selected categories, a query relevance indicator of the query is calculated with each subcategory using keyword relevance indicators, each subcategory is ranked based on the query relevance indicators, and the ranked subcategories are provided for use in selecting new categories to be submitted with the query.

BRIEF DESCRIPTION OF THE SEVERAL VIEWS OF THE DRAWINGS

Referring now to the drawings in which like reference numbers represent corresponding parts throughout:

FIG. 3 is formed by FIG. 3A, FIG. 3B, FIG. 3C, and FIG. 3D.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

In embodiments, services mentioned herein refer to any services implemented on an information system and that can be accessed from telecommunication networks. Services include, but are not limited to, web services.

Figure 1:
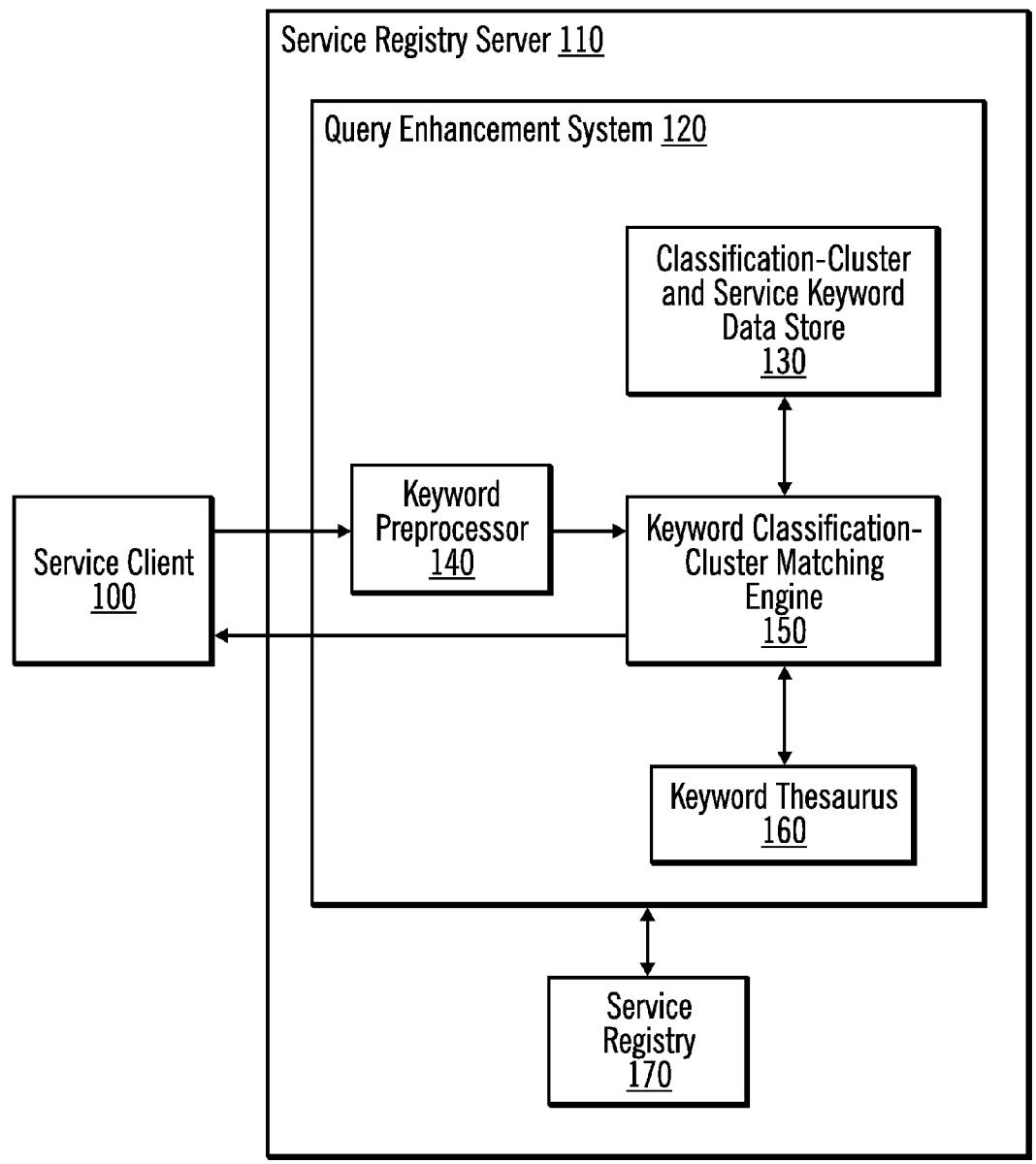
FIG. 1 illustrates a computing architecture including a query enhancement system in accordance with certain embodiments.

FIG. 1 illustrates a computing architecture including a query enhancement system 120 in accordance with certain embodiments. A service client 100 interacts with service registry server 110 through a communication network. The service registry server 110 includes the query enhancement system 120 and a service registry 170. In certain embodiments, the service client 100 may interact with the service registry server 110 through one or more user interfaces provided by the query enhancement system 120.

The query enhancement system 120 provides an integrated and iterative process to generate and identify the proper keywords and classification and/or cluster categories for a service or services published in service registry 170, and the identified keywords are used to enhance (i.e., improve) a query. The query enhancement system 120 provides a hybrid technique that combines both keyword search and category selection/search in an integrated manner. On the other hand, conventional systems may combine keyword and category search as a composite query by executing two separate queries, then combining the result with a logic operation, such as "AND" or "OR".

The query enhancement system 120 has four components: a classification-cluster and service keyword data store 130 ("keyword data store" 130), a keyword preprocessor 140, a keyword classification-cluster matching engine 150 ("matching engine" 150), and a keyword thesaurus 160.

The query enhancement system 120 utilizes the iterative keyword and category based process to discover, for example, web services available in service oriented information systems and networks. In alternative embodiments, the query enhancement system 120 may discover items other than web services.

The service registry 170 enables service providers to publish their services and enables service consumers to search and use these published services. The service registry 170 stores the information of the published services.

The matching engine 150 provides a mechanism to integrate the keyword search and category browsing into a mutual-correction and self-correction search process by allowing users to provide feedback.

The keyword data store 130 holds the information of the keywords of services provided by service providers or generated from service metadata, as well as, the relationship information between these keywords and classification/cluster categories. The information in the keyword data store 130 is retrieved or derived from the service information stored in the service registry 170.

The relationship information between the keywords and classification/cluster categories is defined as a relevance indicator, which is the weight of a keyword associated with a category (and referred to herein as a keyword relevance indicator). The relevance indicator is also used as the weight of a query associated with a category (and referred to herein as a query relevance indicator).

Keyword preprocessor 140 is employed to verify that the query keywords are valid. The keyword thesaurus 160 is employed in the process for identifying keyword synonyms. With reference to synonyms, the meaning of words depends on the context in which they are used. For example, the terminologies used by the server provider may be different from the ones used by the service client 100.

Services may be grouped into classifications or clusters. Classifications may be created by standard bodies and may have clearly defined and well-understood names for subcategories. Clusters or hierarchies of clusters may be created by the service registry server 110 implementing the iterative keyword and category search technique described herein. In certain embodiments, the services are grouped into the same clusters if they have similar keywords. In certain embodiments, clusters do not have well-defined names. When a cluster is identified and needs to be rendered to a user, the information of a typical sample service in the cluster is sent to the user. The user decides whether to select the cluster by specifying whether the sample service is similar to the one(s) the user is trying to find. In various embodiments, a user may be a human, computer program, device, etc.

In certain embodiments, classifications used herein refer to the standard categories into which the things of the same type are grouped, such as North American Industry Classification System (NAICS). Usually these classifications are developed by standard bodies and can be plugged into a service registry if they are not a build-in feature. Classification is a categorization mechanism which can be utilized in the keyword search technique. Nevertheless, any classification has limited and fixed levels. It is possible that there are thousands or more services grouped into the same subcategory at a classification's finest level. In this case, further categorization/grouping is desired within this finest subcategory.

The communication between the service client 100 and the query enhancement system 120 is an iterative process. The service client 100 and the query enhancement system 120 pass keyword and classification-cluster category information back and forth multiple times to identify the proper keywords and classification-cluster categories for the services that a user at the service client 100 is trying to find.

When the service client 100 communicates with the query enhancement system 120, the keyword preprocessor 140 receives the query first from the service client 100 and examines the keywords to make sure the keywords are valid, such as no spelling errors. If the keyword preprocessor 140 identifies an error in the keywords, the keyword preprocessor 140 informs the matching engine 150, and the matching engine 150 forwards the information to the service client 100 in a message sent back to the service client 100.

The matching engine 150 is the component implementing the matching techniques. The matching engine 150 receives the preprocessed query from the keyword preprocessor 140, retrieves classification-cluster category keywords from the keyword data store 130, fetches synonyms of keywords from the keyword thesaurus 160, compares the keywords in the query and the keywords in the categories, and generates an updated version of keywords and a ranked category list. The matching engine 150 renders the modified keyword and category information back to the service client 100 for further feedback and adjustment.

The keyword data store 130 is the data store in which the keywords for each service and classification/cluster category are stored. The query enhancement system 120 calculates the key relevance indicator of every keyword for each category and stores these relevance indicator values in the keyword data store 130.

The keyword thesaurus 160 is a thesaurus which is utilized by the matching engine 150 to find synonyms between two sets of keywords. In certain embodiments, two keywords are synonyms if they have the same or a very similar meaning The query enhancement system 120 enables service consumers to identify proper services published in a service registry by specifying or selecting a number of keywords and by selecting/specifying proper classification or cluster categories to which the services belong in an iterative process. In particular, the matching engine 150 identifies the proper keywords and the categories to which the best-fit services belong. The scope of the search for suitable services can be narrowed down efficiently by navigating down the classification and cluster hierarchy, with selection of keywords at each classification and cluster level in a mutual correction process. The synonym issue is addressed with the keyword thesaurus 160. The query enhancement system 120 allows service users to retrieve a list of candidate services at the end of process.

In certain embodiments, the query enhancement system 120 provides assistance on keyword selection and category identification for both service consumers and providers. The query enhancement system 120 facilitates the service searching process by ranking the categories and guiding service users to make correct keyword selections.

With the query enhancement system 120, intelligence is built-in to utilize the relationships between queried keywords and categories, to give the user recommendations (i.e., suggestions), and to analyze the user's feedback to do a more effective search.

The query enhancement system 120 provides a process to collect and utilize the relationships between service keywords and the hierarchical classification and clustering categories where services belong. The same concept can be applied to other context related service metadata in a service registry as well.

More specifically, by comparing the keywords supplied by a user and the keywords associated with each classification and/or cluster category, the matching engine 150 may quickly identify the proper keywords and the related services, with additional help from the keyword thesaurus 160 and the feedback from the user. The user's feedback includes providing the keyword and category information about the service iteratively.

When a service registry stores the information of thousands or even millions of services, it is often inefficient to require users to give the detailed and specific information about the services they want to find. Instead, it may be more practical to allow the users to give a number of keywords, and then make straightforward selections based on recommended keywords provided by the matching engine 150. That is, with the query enhancement system 120, it is the task of the matching engine 150 to help identify the best fit services for the users.

The query enhancement system 120 provides a matching engine 150 to enable users to search services published in a registry (in a manner similar to how a web search engine may be used to search web pages), with limited or no prior knowledge about the registry structure and the exact details of the services published in the registry.

Similarly, the keyword and categorization information improvement techniques employed by the query enhancement system 120 can not only help service consumers to search services, but also help service providers to document and classify their services.

Figure 2:
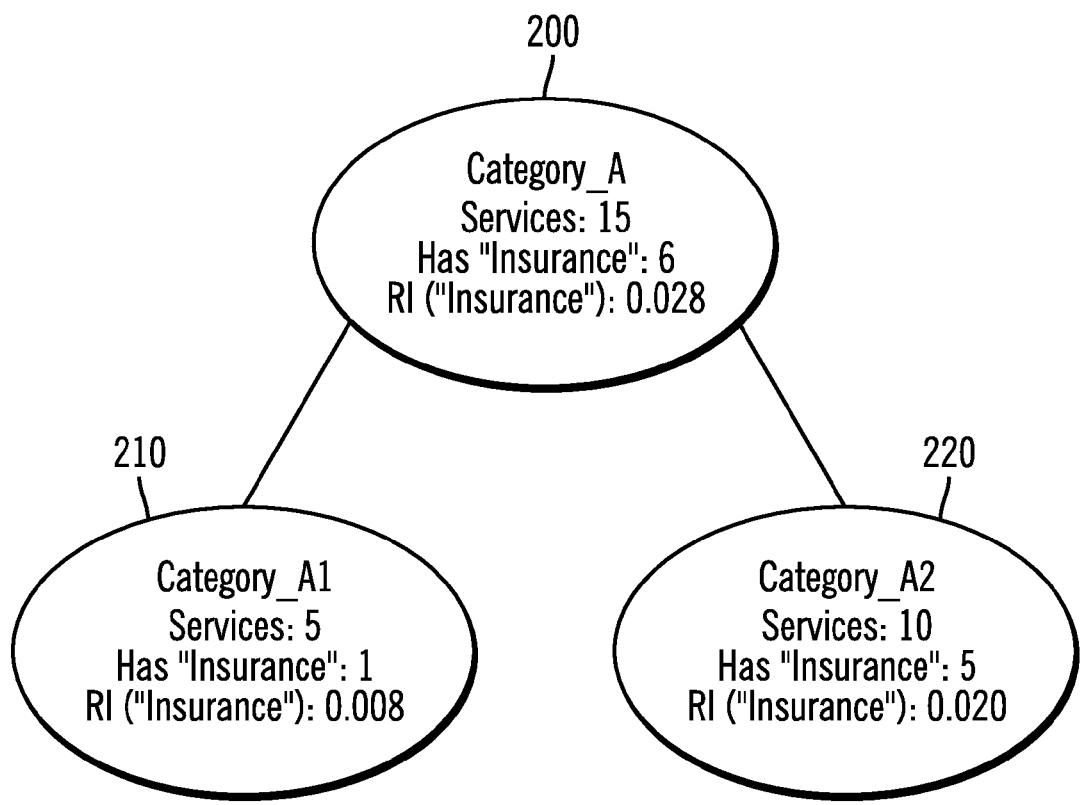
FIG. 2 illustrates a graph of a category with two subcategories in a classification hierarchy or a cluster hierarchy in accordance with certain embodiments.

FIG. 2 illustrates a graph of a category with two subcategories in a classification hierarchy or a cluster hierarchy in accordance with certain embodiments. In particular, FIG. 2 is a graph illustrating a two-level category hierarchy. Category_A 200 (at a first level) has two subcategories Category_A1 210 (at a second level) and Category_A2 220 (at a second level).

FIG. 2 is used to describe the measurement, relevance indicator, of the relationship between two entities, such as a keyword and a category.

In certain embodiments, when a service is published in the service registry, the service provider provides the keywords and classification information of the service. If a service belongs to a category, then all of its keywords belong to this category and to all of its ancestor categories.

For instance, if an auto-insurance quote service is published in the registry, the service provider may specify that this service belongs to category "Insurance Agencies & Brokerages" in the North American Industry Classification System (NAICS). This category is a subcategory of category "Insurance Carriers and Related Activities", which in turn is a subcategory of category "Finance and Insurance". In this case, all the keywords specified for this service are also keywords for category "Insurance Agencies & Brokerages", as well as, its parent category "Insurance Carriers and Related Activities" and grandparent category "Finance and Insurance". Keywords in each category may have different weights, called keyword relevance indicators, associated with the category.

A relevance indicator may be described as a weight to measure how relevant two documents are. Each of the documents contains a set of keywords. A document may be a single keyword, a service, a query, or a category.

In particular, a query with a list of keywords can be viewed as a document. A category containing a collection of keywords can also be viewed as a document. Different schemes to measure similarity of documents based on the weight of their keywords have been developed in the information retrieval research, such as cosine similarity, Euclidean distance, Dice coefficient, and Jaccard index. Some of these schemes may be employed to measure the similarity between a query and a category. In conventional information retrieval systems, the weights of the keywords used in some of these schemes are computed using a Term Frequency-Inverse Document Frequency (TF-IDF) based technique.

The collection of keywords of a service can also be viewed as a document. To further categorize services, when a classification reaches its finest level, a number of similarity schemes, such as cosine similarity or Euclidean distance, may be used to measure the similarity between services based on their keywords. If there are too many services in a single cluster, the services in this cluster can be further divided into smaller clusters. This process can be done recursively to create a cluster hierarchy. A number of clusters or cluster hierarchies can be built in a classification hierarchy to facilitate the iterative keyword search. The techniques, such as agglomerative hierarchical clustering or hierarchical frequent term-based clustering, developed in the field of hierarchical document clustering research, may be implemented to create the cluster hierarchy.

The keyword relevance indicator (RI) is a measure similar to TF-IDF, which is a weighting scheme used to evaluate how important a term is to a document in a collection of documents.

On the same token, Keyword Frequency (KF) of a keyword associated with a category is similar to TF. KF measures how often a keyword appears in a category. In certain embodiment, it is defined as the quotient of the total number of services, which contain the keyword, in the category and the sum of the numbers of all the keywords each service has in the category. Equation (1) specifies $KF_i$:

$$KF_i = \frac{\sum_{j=1}^{N} n_{ij}}{\sum_{j=1}^{N} \sum_{k=1}^{M} n_{kj}}$$

In Equation (1), $KF_i$ is the keyword frequency for keyword i in a category; M is the total number of keywords in the category; N is the total number of services in the category; both i and k are integers between 1 and M; for any i ∈ [1, M] and j ∈ [1, N], $n_{ij}$ is 1 if service j in the category has keyword i, and $n_{ij}$ is 0 if service j in the category does not have keyword i; and for any k ∈ [1, M] and j ∈ [1, N], $n_{kj}$ is 1 if service j in the category has keyword k, and $n_{kj}$ is 0 if service j in the category does not have keyword k.

Equation (1) assumes that each service has the same number of keywords. If this is not the case, and the services are treated equally in certain embodiments, the value of $n_{kj}$ (or $n_{ij}$), instead of being 1 if the service j has the keyword k, may be adjusted so that the sum of $$n_{kj}, \sum_{k=1}^{M} n_{kj},$$

for each service j is the same for all the services.

However, the uniqueness measure of a keyword in a collection of services, like Inverse Document Frequency (IDF), may not be defined at the category level in certain embodiments because categories comprising a large number of services may contain the same keyword. So, the quotient of the number of categories containing the keyword and the total number of categories in an entire classification system is always equal to or close equal to 1, which renders this measure ineffective in certain embodiments. This issue is avoided if the document containing the individual keywords is defined at the service level. The document collection can be defined at the scope of the entire classification/cluster domain in certain embodiments. Nevertheless, it is typical that categories within the same parent category are compared. It is more accurate to measure the keyword uniqueness at the finer level by defining the document collection as the parent category/categories of the specific category/categories of which the keyword's uniqueness is measured. That is, Inverse Service Frequency (ISF) at a specific category or categories, in certain embodiment, is defined as the log of the quotient of total number of services and the number of services containing the keyword in the parent category/categories. Equation (2) specifies $ISF_i$:

$$ISF_i = \log \frac{N}{\sum_{j=1}^{N} n_{ij}}$$

In Equation (2), $ISF_i$ is the inverse service frequency for keyword i in a specific category or categories of a classification system; $n_{ij}$ is 1 if service j has keyword i, and $n_{ij}$ is 0 if service j does not has keyword i; and N is the total number of services registered in the parent category or categories.

$RI_i$ is the keyword relevance indicator of keyword i with a category. Equation (3) specifies $RI_i$:

$$RI_i = KF_i \times ISF_i$$

$RI_Q$ is the query relevance indicator of a query with a category to measure the similarity between the query and the category. $RI_Q$ of a query containing a plurality of keywords is an aggregation of the keyword relevance indicators of these keywords with this category. In certain embodiments, similar to the cosine similarity used with the vector space model developed in information retrieval research, $RI_Q$ is the cosine of the angle between two multidimensional vectors representing the query and the category. Equation (4) specifies $RI_Q$:

$$RI_Q = \frac{\sum_{i=1}^{M_Q} RI_i}{\left(M_Q \times \left(\sum_{i=1}^{M_Q} RI_i^2 + \sum_{j=M_Q+1}^{M_C} RI_j^2\right)\right)^{\frac{1}{2}}}$$

In Equation (4), $RI_i$ is the keyword relevance indicator of keyword i with the category; keyword i is a keyword specified in the query; $M_Q$ is the total number of keywords in the query; $RI_j$ is the keyword relevance indicator of keyword j with the category; keyword j is a keyword in the category, but not in the query; and $M_C$ is the total number of different keywords in the category and the query (i.e., $M_C$ is the size of the union of the set of the query keywords and the set of the category keywords).

Since Equation (4) based on vector space model may generate overly small $RI_Q$ values for large categories with more number of services and keywords, the value of $RI_Q$ needs to be adjusted in certain embodiments if the sizes of the categories under comparison are significantly different.

A simple case illustrating the above concept is shown in FIG. 2. If Category_A1 210 has 5 services, and Category_A2 220 has 10 services, then Category_A 200 has a total of 15 services. These services are unique. Assume that only one service in Category_A1 210 contains the keyword "insurance", and five services in Category_A2 220 contain the same keyword "insurance". That means that Category_A has six services containing the keyword "insurance". In addition, each service contains 10 keywords. In the parent category of Category_A200, assume that one in every five services contains the keyword "insurance". The keyword relevance indicator of the keyword "insurance" with each category is:

$$\text{Category\_A: } RI''_{insurance} = \frac{6}{10 \times 15} \times \log 5 = 0.028$$

$$\text{Category\_A1: } RI''_{insurance} = \frac{1}{10 \times 5} \times \log \frac{15}{6} = 0.008$$

$$\text{Category\_A2: } RI''_{insurance} = \frac{5}{10 \times 10} \times \log \frac{15}{6} = 0.020$$

FIG. 3 illustrates, in a flow diagram, logic performed by the keyword and classification category matching process within the query enhancement system 120 in accordance with certain embodiments. FIG. 3 is formed by FIG. 3A, FIG. 3B, FIG. 3C, and FIG. 3D.

In FIG. 3, the query enhancement system 120 processes a query received from a service client 100. In certain embodiments, the matching iteration is performed at a specific classification level in each classification system (i.e., the service registry 170 may have multiple classification systems). The query enhancement system 120 returns the updated keyword and classification category information to the service client 100 at the end of each iteration. The service client 100 may then provide feedback by selecting displayed query keywords, category keywords and categories, and the selections are used in the next iteration. The query improvement process employed by the query enhancement system 120 may iterate many times before it reaches the lowest category levels, as is illustrated with blocks 308-312, or the service client 100 quits the process, as is illustrated with blocks 334-342.

Processing begins at block 300 (FIG. 3A), with the query enhancement system 120 receiving a query Q from the service client 100. Keywords in the query will be referred to as query keywords, while keywords in the classification categories will be referred to as category keywords. In certain embodiments, in the first iteration, the query generated by the service client 100 may include the query keywords, and may or may not include the classification categories specified by the service client 100. However, at the end of the first iteration and each subsequent iteration, the query enhancement system 120 may recommend categories and category keywords, and the service client 100 may select one or more of the category keywords to be included in the query as query keywords. In certain embodiments, each query in subsequent iterations contains the keywords and the classification categories specified or confirmed by the service client 100. These specified or confirmed categories in the query are called selected categories. For each classification system, it is possible that a query has more than one selected category.

In block 302, the matching engine 150 sets a current category level. In certain embodiments, a new query starts at the root/top category level of each classification system, if the service client 100 does not specify any classification category at the beginning At each iteration, the current category level moves down zero, one or multiple levels in each hierarchical classification system depending on whether the service client 100 feedback is being used to identify the proper subcategory or subcategories. In certain embodiments, if the service client 100 changes one or more keywords in the query by itself (i.e., not the recommended changes suggested by the query enhancement system 120), the query may be treated as a new query by the query enhancement system 120.

In block 304, the keyword preprocessor 140 receives the query and preprocesses the keywords. If the keyword preprocessor 140 identifies a spelling error or a stop word, the keyword preprocessor 140 informs the matching engine 150 to ignore the wrongly spelt word or stop word and to forward the information to the service client 100 to correct the query.

In block 306, the matching engine 150 receives the preprocessed query and determines whether the client selected categories of the query are ranked high in terms of the query relevance indicator value with each category. In certain embodiments, the determination is for all of the selected categories. If one or more selected categories have low associated query relevance indicator values, processing continues to block 322 (FIG. 3C) to find recommended keyword changes to eliminate the mismatch between the keywords and the selected categories of the query.

An example to illustrate the above mismatch scenario is the following one: a query, Q, submitted by client 100 contains three keywords: "insurance", "car", and "driver". The selected category is Category_A2 220 depicted in FIG. 2. However, Category_A1 210, also depicted in FIG. 2, is ranked high in terms of the query relevance indicator with query Q as shown below. Assume that the keyword relevance indicators between the keywords and the two categories are:

Category_A1: $RI_{\text{"insurance"}}=0.008$, $RI_{\text{"car"}}=0.025$, $RI_{\text{"driver"}}=0.030$ Category_A2: $RI_{\text{"insurance"}}=0.020$, $RI_{\text{"car"}}=0.005$, $RI_{\text{"driver"}}=0.004$ For simplicity, assume the values of term $$\left(\sum_{i=1}^{M_Q} RI_i^2 + \sum_{j=M_Q+1}^{M_C} RI_j^2\right)$$

in Equation (4) for both category Category_A1 and Category_A2 are 0.01. The calculated query relevance indicators of query Q with the two categories are:

$$\text{Category\_A1: } RI_Q = \frac{0.008 + 0.025 + 0.030}{(3 \times 0.01)^{\frac{1}{2}}} = 0.364$$

$$\text{Category\_A2: } RI_Q = \frac{0.020 + 0.005 + 0.004}{(3 \times 0.01)^{\frac{1}{2}}} = 0.167$$

If all of the selected categories have high query relevance indicator values, processing continues to decision block 308.

Figure 3A:
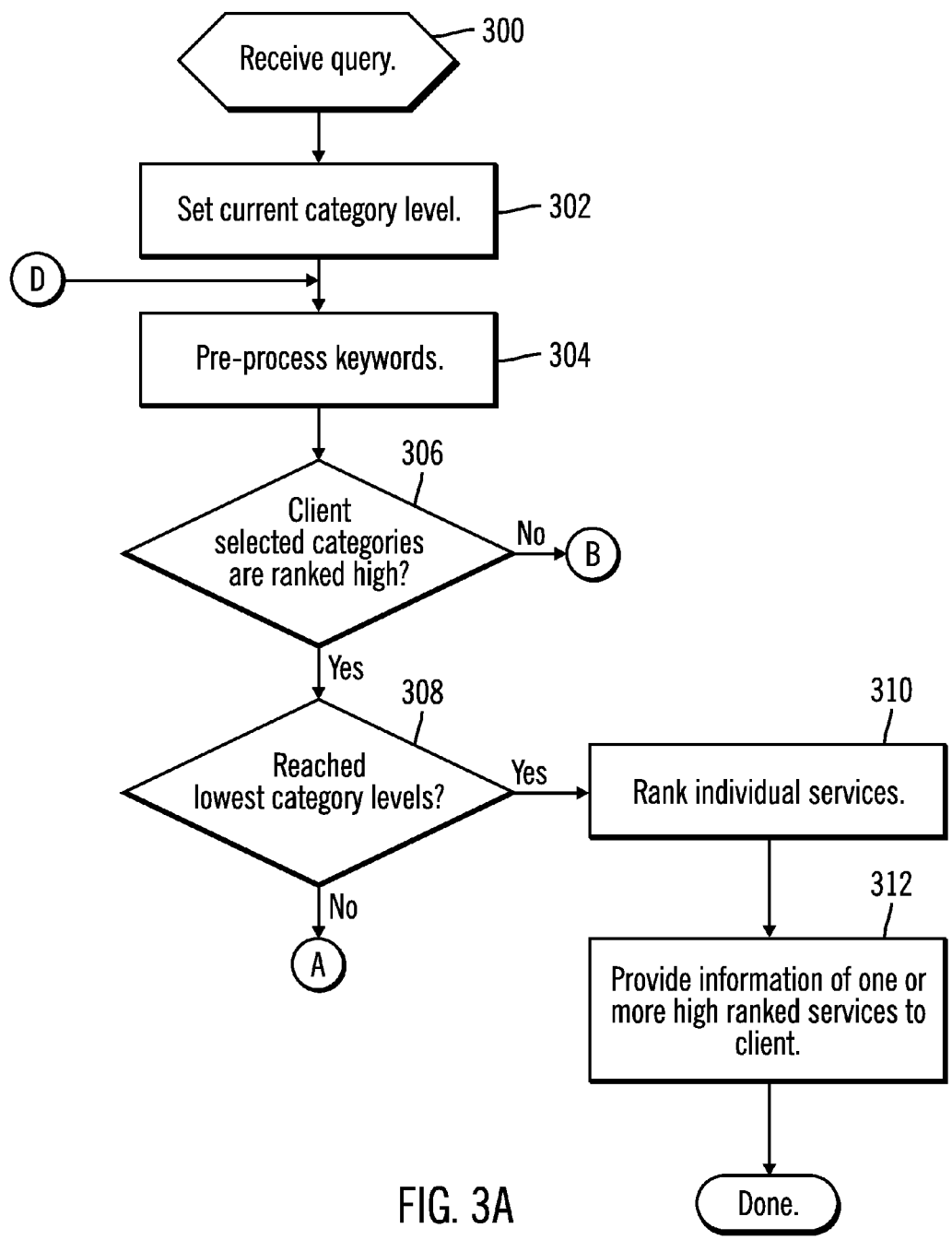
FIG. 3 illustrates, in a flow diagram, logic performed by the keyword and classification category matching process within a query enhancement system in accordance with certain embodiments.
Figure 3B:
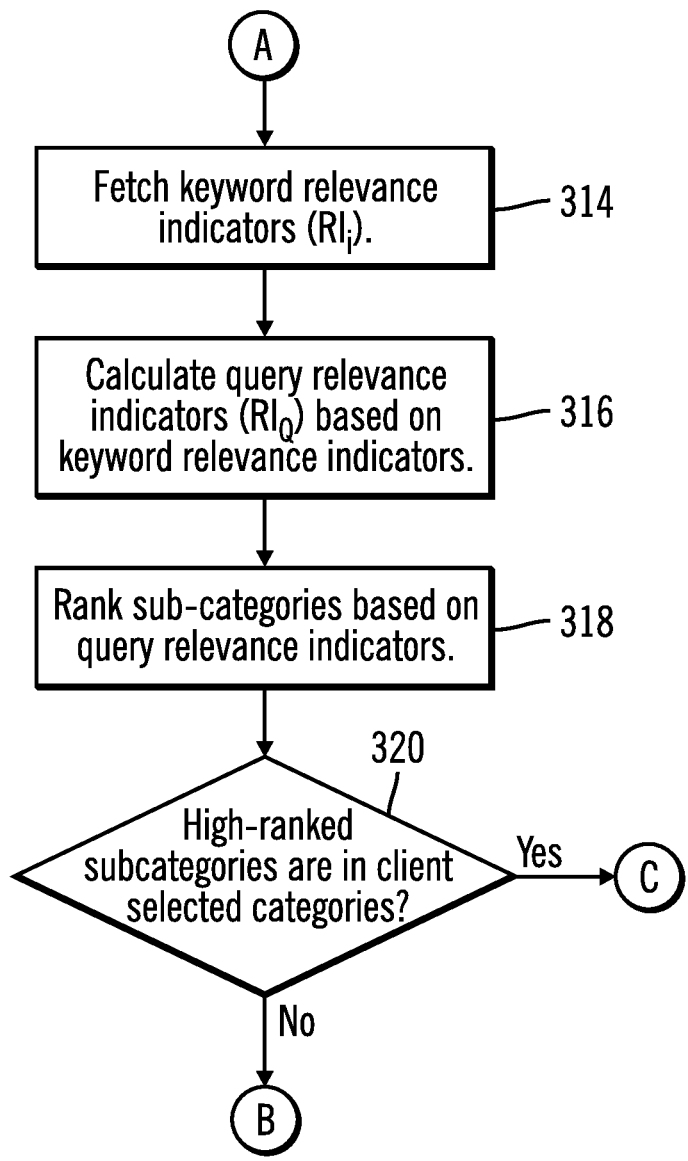
Figure 3C:
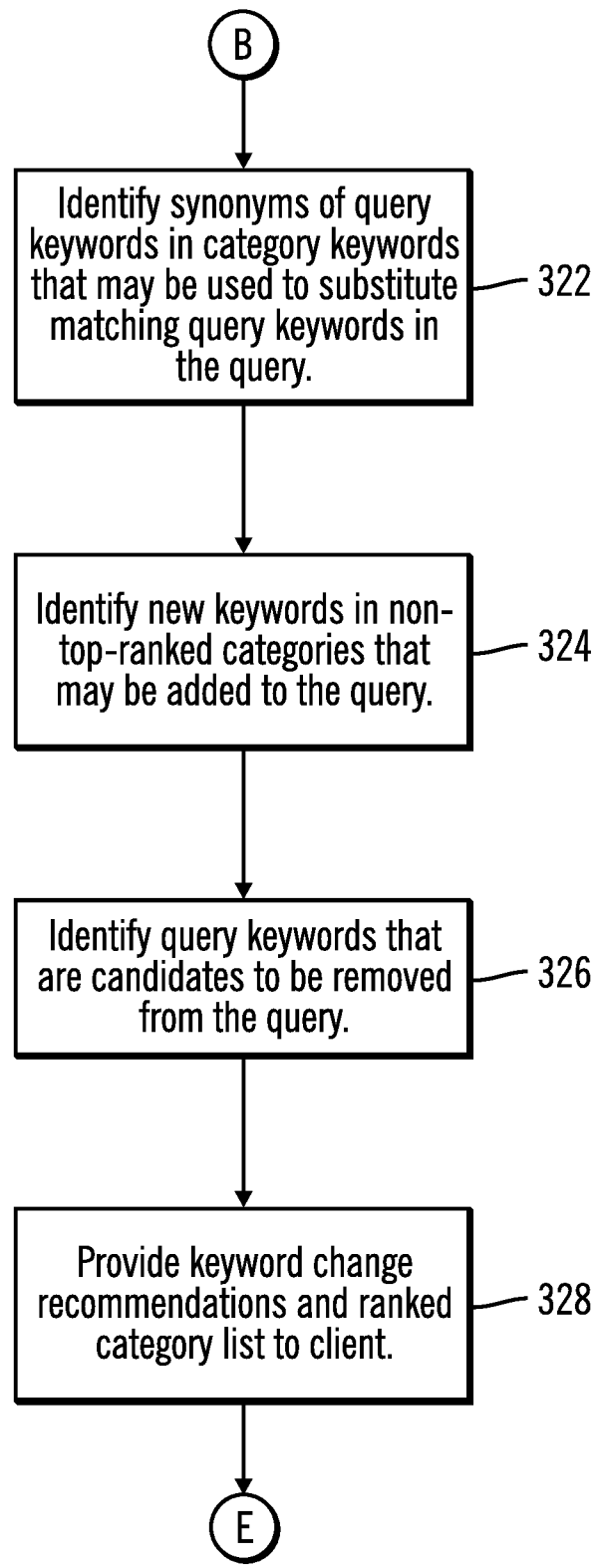

In block 308, the matching engine 150 determines whether the lowest category levels of each classification system have been reached. If so, processing continues to block 310, otherwise, processing continues to block 314 to traverse one or more levels down in each of the classification hierarchies (FIG. 3B).

In certain embodiments, the lowest category level of each category of each classification system contains one or more individual services. In block 310, the matching engine 150 ranks the individual services that are at the lowest category levels. In block 312, the matching engine 150 provides the information of one or more high ranked services to the service client 100 in response to the query. Then, processing is done.

In block 314, the matching engine 150 fetches (i.e., retrieves) the keyword relevance indicator ($RI_i$) of each keyword in the query for each subcategory of each selected category from the keyword data store 130. In block 314, the fetching may include fetching data and calculating the keyword relevance indicators. In block 316, the matching engine 150 calculates the query relevance indicator of the query ($RI_Q$) with each of those subcategories using the keyword relevance indicators. The query relevance indicator for a category describes how closely the category is related to a query (i.e., how similar they are in term of the keywords they have in common).

In certain embodiments, other categories at the same level of the selected categories in a classification system are not recommended to or chosen by the service client 100. But if the query relevant indicators for these categories reach a certain threshold to show that these categories might also be related to the query, the query relevance indicators of the query with each subcategory of these categories are also calculated and ranked.

In block 318, the matching engine 150 ranks the subcategories in each classification system based on their query relevance indicators.

In certain embodiments, if the value of the query relevance indicator of a certain subcategory is significantly higher than others in a classification system, the matching engine 150 may assume that this subcategory is a selected category before the confirmation from the service client 100. In such embodiments, the matching engine 150 moves the current category level one more level down in the hierarchy, and the matching engine 150 calculates and ranks the relevant indicators of the subcategories of this subcategory. This process can be repeated until the matching engine 150 reaches a point where no subcategory has a significantly high query relevance indicator value, and the selection from the service client 100 is needed.

In block 320, the matching engine 150 determines whether each selected category specified or confirmed by the service client 100 includes at least one subcategory ranked high (based on the ranking in block 318). If so, the processing continues to block 330, otherwise, processing continues to block 322.

In block 330, the matching engine 150 sets the subcategory level of the current category level as the current category level. In block 332, the matching engine 150 sends the unchanged keywords and the newly ranked category list (called subcategory list before the current category level is changed) to the service client 100 to enable the service client 100 to select or verify new subcategories.

In block 334, the matching engine 150 determines whether a query with specified or confirmed keywords and categories has been received from the service client 100. If so, the process loops back to block 304 (FIG. 3A) from block 334 (FIG. 3D) to perform another iteration of improving the query, otherwise, processing continues to block 336. In block 336, the matching engine 150 determines whether the service client 100 indicates that the query should be executed in the current form or in a previous form with no further iterations to be performed (e.g., via a user interface). If so, processing continues to block 338, otherwise, processing is done. In certain embodiments, after a period of time in which feedback is not received, the matching engine 150 determines that the service client 100 prefers to quit the process without executing the query in the current form or in a previous form. In such a case, the matching engine 150 quits without executing the query.

In block 338, the matching engine 150 executes the query in the current form or in a previous form. In certain embodiments, the service client 100 is able to identify a particular previous form to be executed. In block 340, the matching engine 150 ranks the services based on their query relevance indicators. In block 342, the matching engine 150 provides a list of one or more high ranked services to the service client 100 (e.g., via the user interface). That is, the matching engine 150 provides information about the one or more services. Then, processing is done (i.e., quit by the service client 100). In certain embodiments, one or more services from the list may be selected by the service client 100 for consumption (i.e., the selected services are provided).

If there is one or more selected categories which have no subcategory ranked high, processing continues from block 320 to block 322. This is caused by the mismatch between the keywords specified by the service client 100 and the keywords belonging to the related categories or subcategories. In block 322, the matching engine 150 identifies synonyms of query keywords in category keywords that may be used to substitute matching query keywords in the query. In particular, the matching engine 150 identifies query keywords with low keyword relevance indicator values for non-top-ranked selected categories to match ones in non-top-ranked categories that may be used to replace the keywords in the query. A non-top-ranked selected category may be described as a selected category whose query relevance indicator value is not among the highest, or none of its subcategories' query relevance indicator values is among the highest.

To identify the synonyms, the matching engine 150 fetches the keyword relevance indicator values of the keywords belonging to the non-top-ranked selected categories in the query, from the keyword data store 130. Then, the matching engine 150 locates the category keywords with high keyword relevance indicator values in the non-top-ranked categories, but not in the query, and vice versa (i.e., locates the query keywords with low keyword relevance indicator values for the non-top-ranked categories). The matching engine 150 also fetches synonyms from the keyword thesaurus 160 and identifies any synonyms between these two groups of keywords (i.e., query keywords and category keywords). If a pair of synonyms are identified, one from each group (i.e., one from the query keywords and one from the category keywords), the recommendation is created to suggest to that the service client 100 replace (i.e., substitute) the keyword in the query with the synonym belonging to the non-top-ranked categories. For example, assume that the non-top-ranked selected category is Category_A2 220. The keyword "auto" has a high keyword relevance indicator value in Category_A2 220, but not in the query Q. On the other hand, the keyword "car" is in query Q, but has a low keyword relevance indicator value in Category_A2 220. The keyword thesaurus 160 indicates that auto and car are synonyms. Therefore, a recommendation is created to suggest that the service client 100 substitute the keyword "car" in the query with the keyword "auto".

In block 324, the matching engine 150 identifies new keywords in the non-top-ranked categories that may be added to the query. In particular, for the keywords in the non-top-ranked categories with high keyword relevance indicator values, if they are not in the query and no synonyms for them are found at block 322, a recommendation is created to suggest that the service client 100 add these new keywords in the query. In certain embodiments, the recommendation is provided from block 324 when the category mismatch occurs between the choices of the service client 100 and the ranking of the matching engine 150. As an example, the keyword "quote" may be identified as such a keyword and a recommendation is created for the service client 100 to add the keyword "quote" into the query Q.

In block 326, the matching engine identifies the query keywords that are candidates to be removed from the query. In particular, the matching engine 150 examines the keywords in the query and locates ones with low keyword relevance indicator values for non-top-ranked categories and high keyword relevance indicator values for top-ranked, but not selected by the service client 100, categories. If no synonyms in the non-top-ranked categories are found for these keywords at block 322, a recommendation is created to suggest that the service client 100 remove these keywords in the query. As an example, the keyword "driver" may be identified as such a keyword and a recommendation is created for the service client 100 to remove the keyword "driver" from the query Q.

In block 328, the matching engine 150 provides the keyword change recommendations and the ranked category list to the service client 100 (e.g., via the user interface). The service client 100 may then provide feedback by selecting keywords to be used in the query and categories to be associated with the query. For example, assume that the service client 100 adopts the change recommendations by replacing keyword "car" with "auto", adding keyword "quote" and removing keyword "driver". Also assume that the keyword relevance indicators of keyword "auto" with Category_A1 210 and Category_A2 220 are 0.006 and 0.026, and keyword relevance indicators of "quote" are 0.004 and 0.032 respectively. Then, the query relevance indicators of query Q with these two categories after the keyword changes are:

$$\text{Category\_A1: } RI_Q = \frac{0.008 + 0.006 + 0.004}{(3 \times 0.01)^{\frac{1}{2}}} = 0.104$$

$$\text{Category\_A2: } RI_Q = \frac{0.020 + 0.026 + 0.032}{(3 \times 0.01)^{\frac{1}{2}}} = 0.450$$

After the changes, the non-top-ranked category Category_A2 220 has a higher relevance indicator than Category_A1 210. Category_A2 220 becomes a top-ranked category rated by the matching engine 150. The category selection mismatch between the service client 100 and the matching engine 150 is corrected after the query keyword change recommendations are adopted.

Figure 3D:
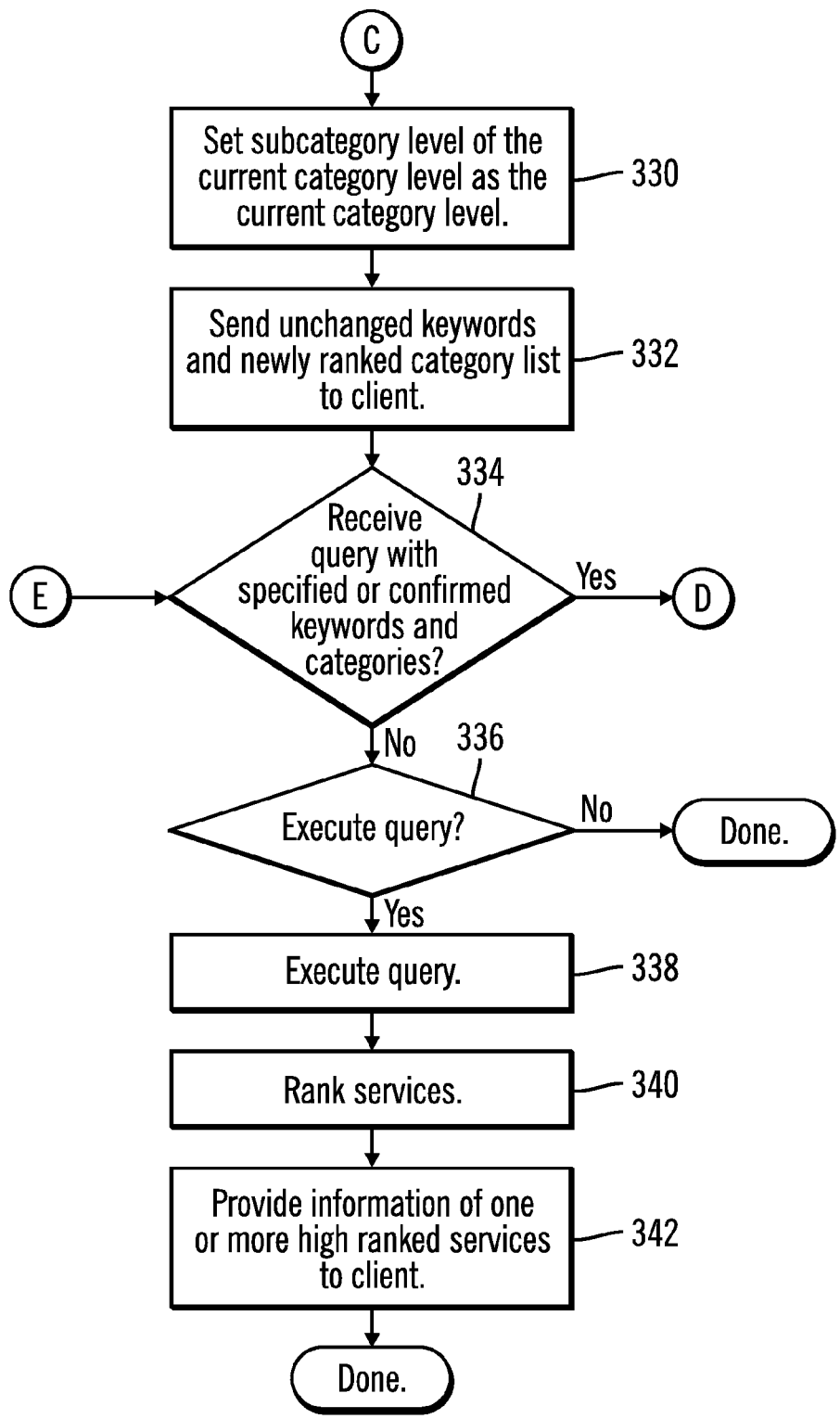

From block 328, processing continues to block 334 (FIG. 3D).

If the current category level is not in a hierarchical classification system, but in a cluster or cluster hierarchy, the process is similar. The difference is that the cluster category may not have a meaningful name in certain embodiments. Then, the matching engine 150 needs to select a typical service in the category to represent this category and render the service information to the service client 100. The service client 100 decides whether the category is to be selected by specifying whether the rendered service is similar to the ones the service client 100 is looking for.

When the process reaches to the finest categories of a classification or cluster hierarchy, the current categories do not have subcategories, but they contain individual services. Each service can be treated as a subcategory and their query relevance indicator will be calculated and ranked. In such embodiments, the service client 100 will receive a ranked service list to choose from, rather than a category list.

Embodiments provide effective search and retrieval of relevant entries in a service repository given a user query consisting of one or more keywords. Embodiments take into consideration existing hierarchical relationships between the keywords of the services in the service repository, in addition to developing a keyword-query-category matching scheme, resulting in an efficient technique for refining the query to improve the query's accuracy and quality.

Embodiments provide an information retrieval technique that helps a user improve a query issued against a data store with hierarchical classification systems based on iterative user feedback.

With embodiments, users do not need to have detailed knowledge about what and how service metadata are stored in the service registry and/or the exact keywords used by the services in the first place to specify query keywords and to carry out effective keyword searches.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The keyword preprocessor 140 and/or the keyword classification-cluster matching engine 150 ("matching engine" 150) may be implemented as hardware (e.g., hardware logic or circuitry), software, or a combination of hardware and software.

In certain embodiments, the matching engine 150 has its own processor and memory.

Figure 4:
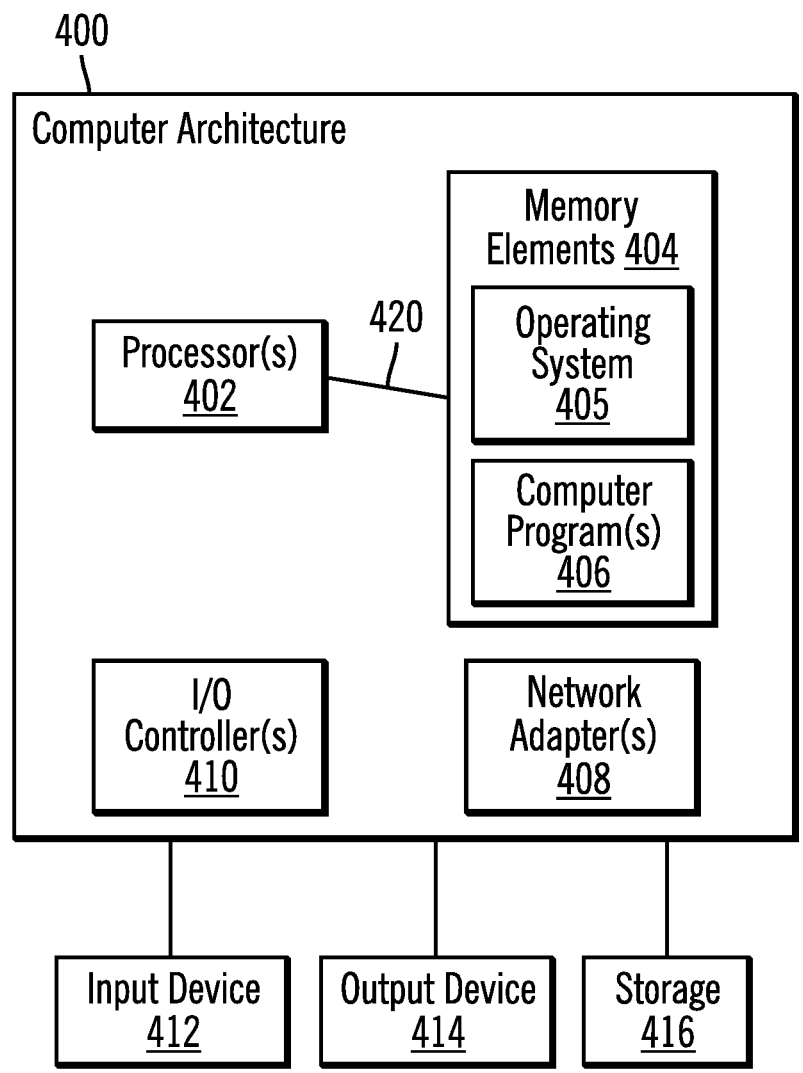
FIG. 4 illustrates, in a block diagram, a computer architecture that may be used in accordance with certain embodiments.

FIG. 4 illustrates a computer architecture 400 that may be used in accordance with certain embodiments. Service client 100 and/or service registry server 110 may implement computer architecture 400. The computer architecture 400 is suitable for storing and/or executing program code and includes at least one processor 402 coupled directly or indirectly to memory elements 404 through a system bus 420. The memory elements 404 may include local memory employed during actual execution of the program code, bulk storage, and cache memories which provide temporary storage of at least some program code in order to reduce the number of times code must be retrieved from bulk storage during execution. The memory elements 404 include an operating system 405 and one or more computer programs 406.

Input/Output (I/O) devices 412, 414 (including but not limited to keyboards, displays, pointing devices, etc.) may be coupled to the system either directly or through intervening I/O controllers 410.

Network adapters 408 may also be coupled to the system to enable the data processing system to become coupled to other data processing systems or remote printers or storage devices through intervening private or public networks. Modems, cable modem and Ethernet cards are just a few of the currently available types of network adapters 408.

The computer architecture 400 may be coupled to storage 416 (e.g., a non-volatile storage area, such as magnetic disk drives, optical disk drives, a tape drive, etc.). The storage 416 may comprise an internal storage device or an attached or network accessible storage. Computer programs 406 in storage 416 may be loaded into the memory elements 404 and executed by a processor 402 in a manner known in the art.

The computer architecture 400 may include fewer components than illustrated, additional components not illustrated herein, or some combination of the components illustrated and additional components. The computer architecture 400 may comprise any computing device known in the art, such as a mainframe, server, personal computer, workstation, laptop, handheld computer, telephony device, network appliance, virtualization device, storage controller, Personal Digital Assistant (PDA), tablet computer, pocket Personal Computer (PC), network PC, hand-held device, set-top box, consumer electronic, minicomputer, supercomputer, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching.

It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for providing recommendations to improve a query, comprising:
receiving a query with query keywords and selected categories; and
in response to determining that the selected categories are ranked high with reference to query relevance indicator values for each of the selected categories,
determining whether a lowest category level has been reached in the selected categories;
in response to determining that the lowest category level has been reached,
ranking individual services that are at the lowest category levels; and
providing one or more high ranked services from the ranked individual services; and
in response to determining that the lowest category level has not been reached,
calculating a keyword relevance indicator of each keyword in the query for each subcategory of each of the selected categories, wherein the keyword relevance indicator for a keyword is calculated using a keyword frequency of the keyword and an inverse service frequency of a subcategory;
calculating a query relevance indicator of the query with each subcategory using the retrieved keyword relevance indicators, wherein the query relevance indicator is generated based on a keyword relevance indicator of a keyword specified in the query and a keyword relevance indicator of a keyword in the subcategory that is not specified in the query;
ranking each subcategory based on the query relevance indicators; and
providing the ranked subcategories for use in selecting new categories to be submitted with the query.

2. The method of claim 1, further comprising:
in response to determining that at least one of the selected categories is ranked low with reference to the query relevance indicator values for each of the selected categories,
identifying a pair of synonyms with a first one of the synonyms associated with a query keyword and a second one of the synonyms associated with a category keyword; and
providing a recommendation that the query keyword be replaced with a synonym from the pair of synonyms.

3. The method of claim 2, wherein the pair of synonyms is identified for the query keywords that have low keyword relevance indicator values for non-top-ranked selected categories.

4. The method of claim 1, further comprising:
for category keywords in non-top-ranked selected categories with high keyword relevance indicator values, identifying the category keywords that are not in the query and for which synonyms are not identified; and
providing a recommendation that the identified category keywords be added to the query.

5. The method of claim 1, further comprising:
identifying query keywords having low keyword relevance indicator values for non-top-ranked selected categories and having high keyword relevance indicator values for top-ranked, but un-selected categories;
from the identified query keywords, identifying the query keywords for which synonyms are not identified; and
providing a recommendation that the query keywords for which synonyms were not identified be removed from the query.

6. The method of claim 1, further comprising:
providing recommendations regarding the query keywords for use in revising the query; and
receiving a revised query based on the provided recommendations.

7. The method of claim 1, further comprising:
executing the query in a current form; and
providing a list of one or more services.

8. The method of claim 1, further comprising:
iterating through levels of categories.

* * * * *